US010021649B2

(12) United States Patent
Manepalli et al.

(10) Patent No.: US 10,021,649 B2
(45) Date of Patent: Jul. 10, 2018

(54) C-DRX MODIFICATION BASED ON MOBILITY AND SIGNAL CONDITIONS

(71) Applicant: Apple Inc., Cupertino, CA (US)

(72) Inventors: Venkateswara Rao Manepalli, Sunnyvale, CA (US); Sarma V. Vangala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/143,073

(22) Filed: Apr. 29, 2016

(65) Prior Publication Data
US 2017/0318536 A1    Nov. 2, 2017

(51) Int. Cl.
| *H04B 17/00* | (2015.01) |
| *H04W 52/02* | (2009.01) |
| *H04W 4/02* | (2018.01) |
| *H04W 24/02* | (2009.01) |
| *H04W 76/28* | (2018.01) |

(52) U.S. Cl.
CPC ......... *H04W 52/0245* (2013.01); *H04W 4/02* (2013.01); *H04W 24/02* (2013.01); *H04W 76/28* (2018.02); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/24* (2018.01); *Y02D 70/26* (2018.01)

(58) Field of Classification Search
CPC ..... H04W 4/02; H04W 24/02; H04W 76/048; H04W 52/0245; H04W 64/00
USPC ......................................................... 455/67.11
See application file for complete search history.

(56) References Cited

U.S. PATENT DOCUMENTS

| 8,320,287 B2 | 11/2012 | Cai et al. | |
| 9,408,069 B2 | 8/2016 | Zhao et al. | |
| 2013/0107727 A1* | 5/2013 | Lunden | H04W 52/0251 370/252 |
| 2013/0194991 A1* | 8/2013 | Vannithamby | H04W 4/005 370/311 |
| 2015/0257016 A1* | 9/2015 | Dural | H04W 24/02 370/252 |
| 2015/0271868 A1* | 9/2015 | Rune | H04W 4/005 370/311 |

(Continued)

*Primary Examiner* — Nay A Maung
*Assistant Examiner* — Angelica M Perez
(74) *Attorney, Agent, or Firm* — Meyertons Hood Kivlin Kowert & Goetzel, P.C.; Jeffrey C. Hood; Joel L. Stevens (57) ABSTRACT

This disclosure relates to techniques for modifying connected mode discontinuous reception (C-DRX) cycle length based on mobility and signal conditions. According to some embodiments, a wireless device may establish a radio resource control connection with a base station providing a cell of a cellular network. A C-DRX configuration may be established with the base station, including selecting a C-DRX cycle length. One or more conditions configured to trigger the wireless device to request C-DRX reconfiguration may be detected. The one or more conditions may be based on mobility and/or signal conditions of the wireless device. A request for C-DRX reconfiguration to the base station may be transmitted based on detecting the one or more conditions. C-DRX with the base station may be re-configured based on the request for C-DRX reconfiguration.

16 Claims, 6 Drawing Sheets

(56) References Cited

U.S. PATENT DOCUMENTS

| | | |
|---|---|---|
| 2015/0341832 A1 | 11/2015 | Hwang et al. |
| 2016/0044578 A1 | 2/2016 | Vajapeyam et al. |
| 2017/0019820 A1* | 1/2017 | Das .................. H04W 36/0016 |
| 2017/0055192 A1* | 2/2017 | Johansson ............. H04W 36/30 |

* cited by examiner

C-DRX MODIFICATION BASED ON MOBILITY AND SIGNAL CONDITIONS

FIELD

The present application relates to wireless devices, including to apparatuses, systems and methods for modifying the C-DRX configuration of a wireless device based on its mobility and signal conditions.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of apparatuses, systems, and methods for modifying the connected-mode discontinuous reception (C-DRX) configuration of a wireless device based on the mobility and/or signal conditions experienced by the wireless device.

When operating in a C-DRX mode, a wireless device may reduce its power consumption by periodically (e.g., rather than continuously) monitoring the wireless medium when not actively exchanging data, and by operating in a reduced power state (e.g., sleeping) when not monitoring the wireless medium. Numerous C-DRX configuration variations may be possible, including a length of the 'C-DRX cycle', one or more timer lengths associated with C-DRX cycle operation, and/or various other parameters.

However, operating in C-DRX may reduce the frequency with which serving cell and/or neighboring cell measurements are taken and/or reported back to the serving cell, at least in some instances, e.g., depending on the length of the C-DRX cycle. For example, a longer C-DRX cycle length may result in less frequent measurement reports being provided to the serving cell than a shorter C-DRX cycle, or than when operating without using C-DRX. This may in turn delay handover procedures (e.g., if the wireless device is highly mobile and/or experiencing weak serving cell strength such that handover procedures might have been triggered earlier), and in some instances could result in radio link failure and call drops. The potential for such problems may increase the longer the C-DRX cycle that is used.

To mitigate such potential issues while retaining at least some benefit from C-DRX operation, it may be possible according to embodiments of this disclosure to adjust the C-DRX configuration of a wireless device based on mobility level and/or signal conditions being experienced by the wireless device. For example, if high mobility and/or weak signal conditions are present while a wireless device has a relatively long C-DRX cycle, the wireless device may be able to request a reduction in C-DRX cycle length (or to disable C-DRX altogether). Based on such a request, the serving cell of the wireless device may re-configure the C-DRX, e.g., with a shorter C-DRX cycle or by disabling C-DRX.

If desired, at a later time the wireless device may likewise be able to request a longer C-DRX cycle (e.g., to improve power consumption profile of the wireless device), for example if a lower mobility level is being experienced and/or strong signal conditions are present.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
AS: Access Stratum
NAS: Non-Access Stratum
RLC: Radio Link Control
RRC: Radio Resource Control
MAC: Media Access Control
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
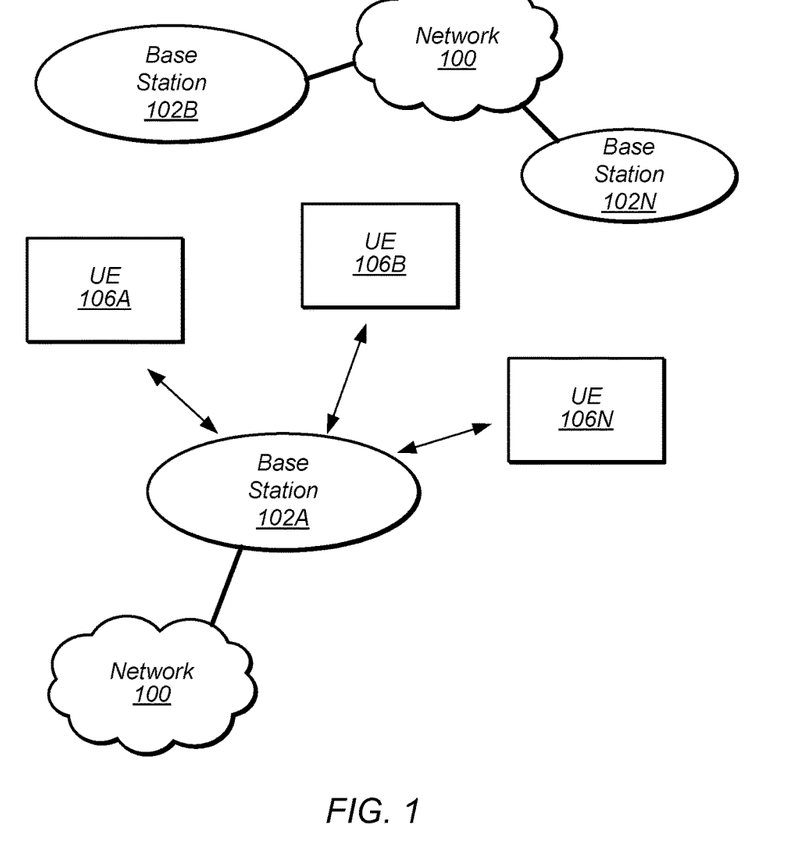
FIG. 1 illustrates an exemplary (and simplified) wireless communication system, according to some embodiments.
Figure 2:
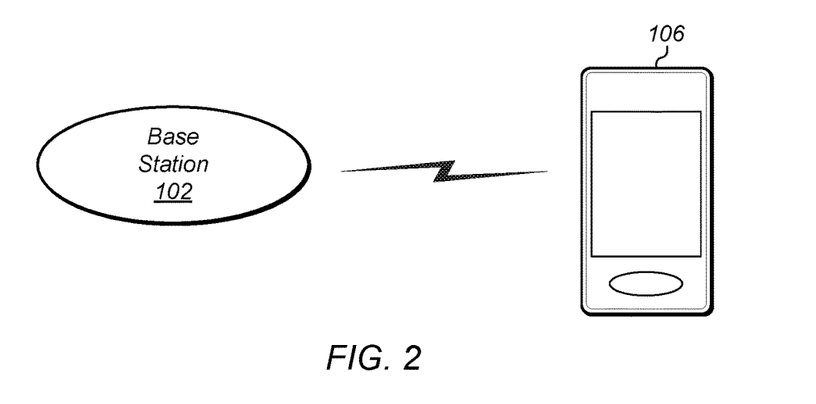
FIG. 2 illustrates a base station (BS) in communication with a user equipment (UE) device, according to some embodiments.
Figure 3:
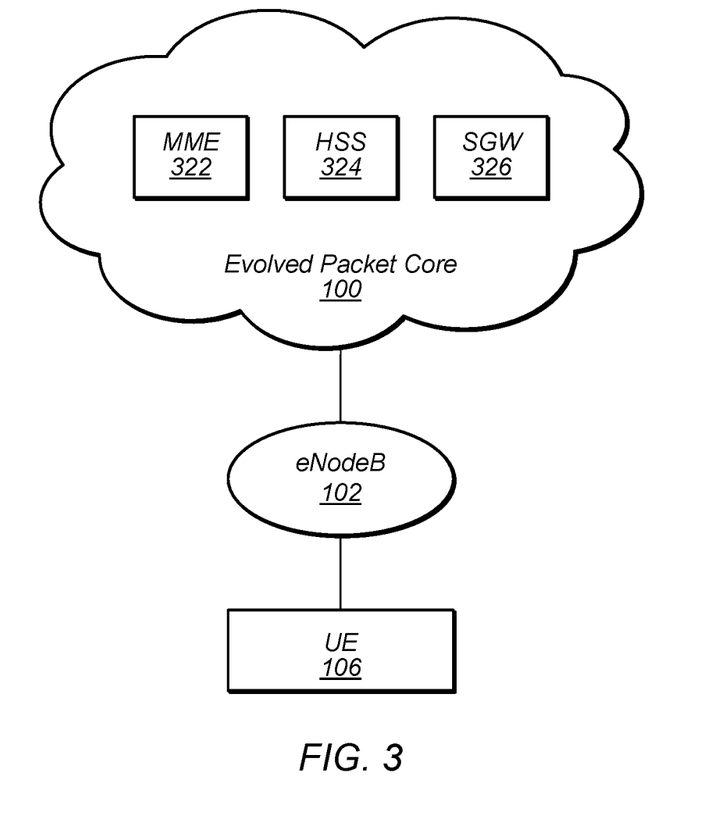
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication among user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
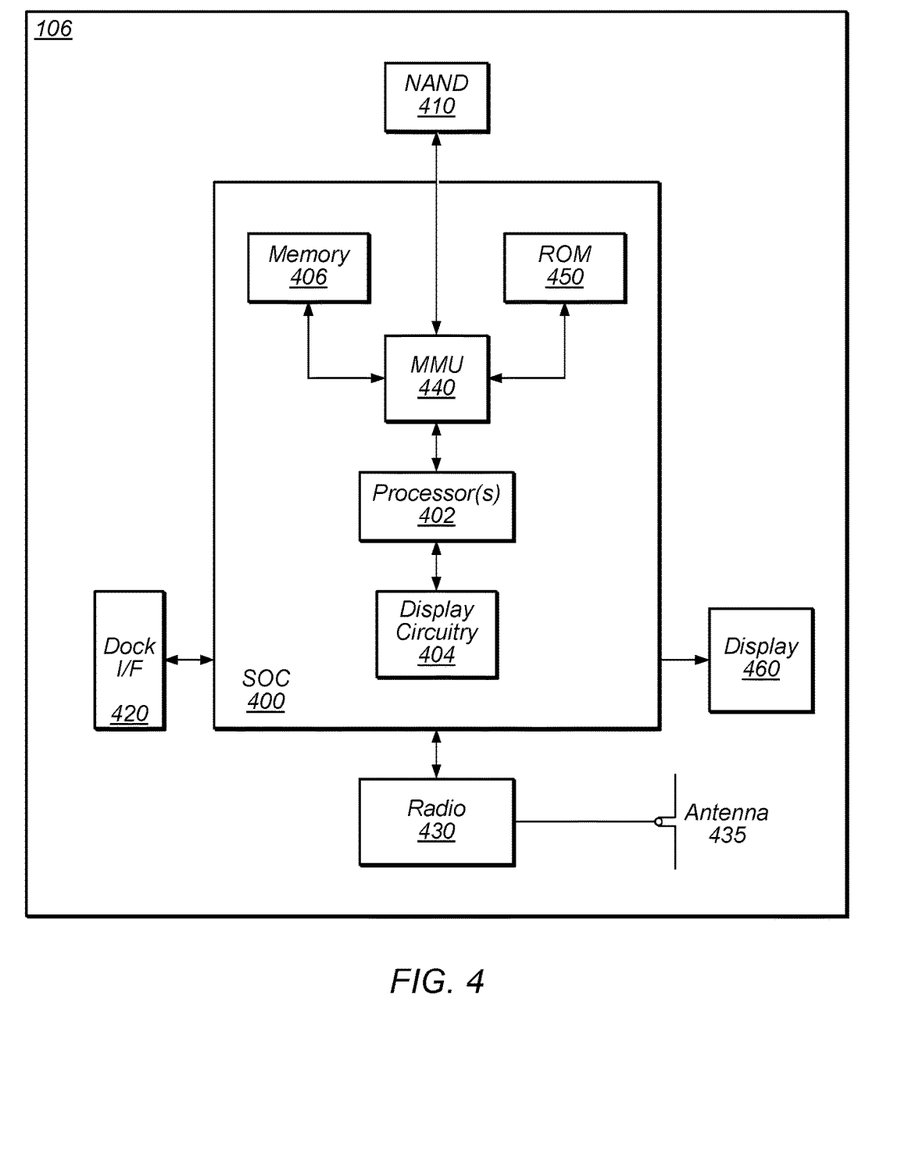
FIG. 4 illustrates an exemplary block diagram of a UE, according to some embodiments.

FIG. 4—Exemplary Block Diagram of a UE Device

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
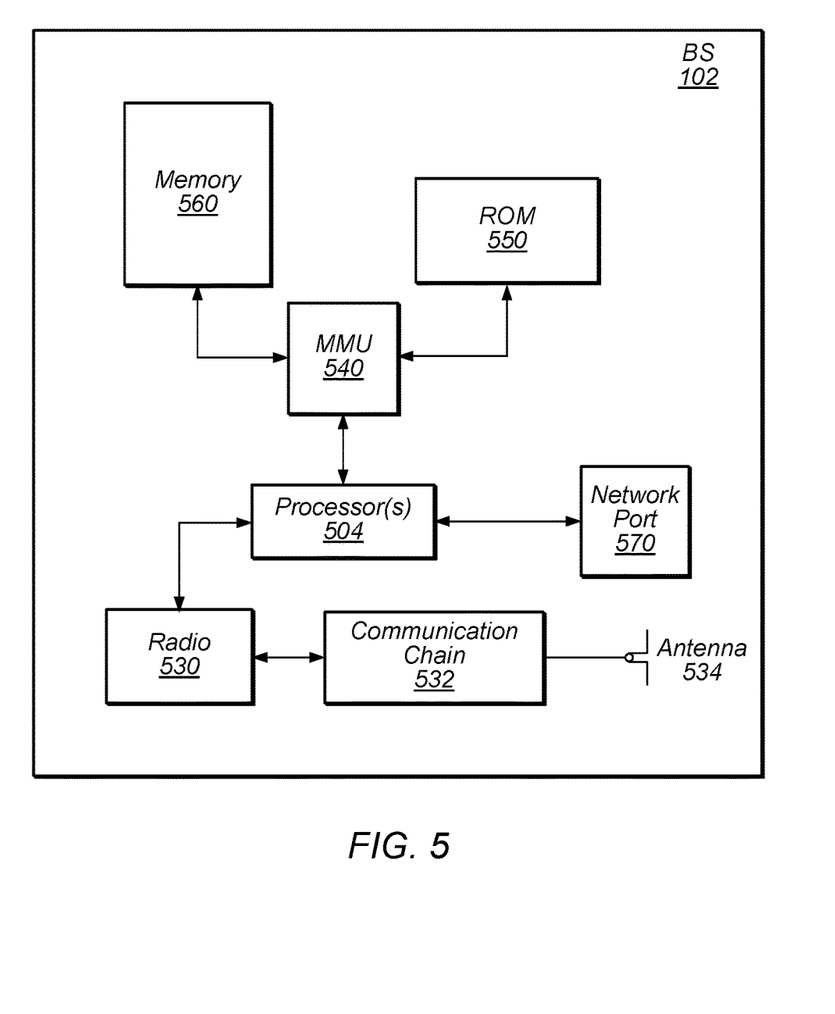
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
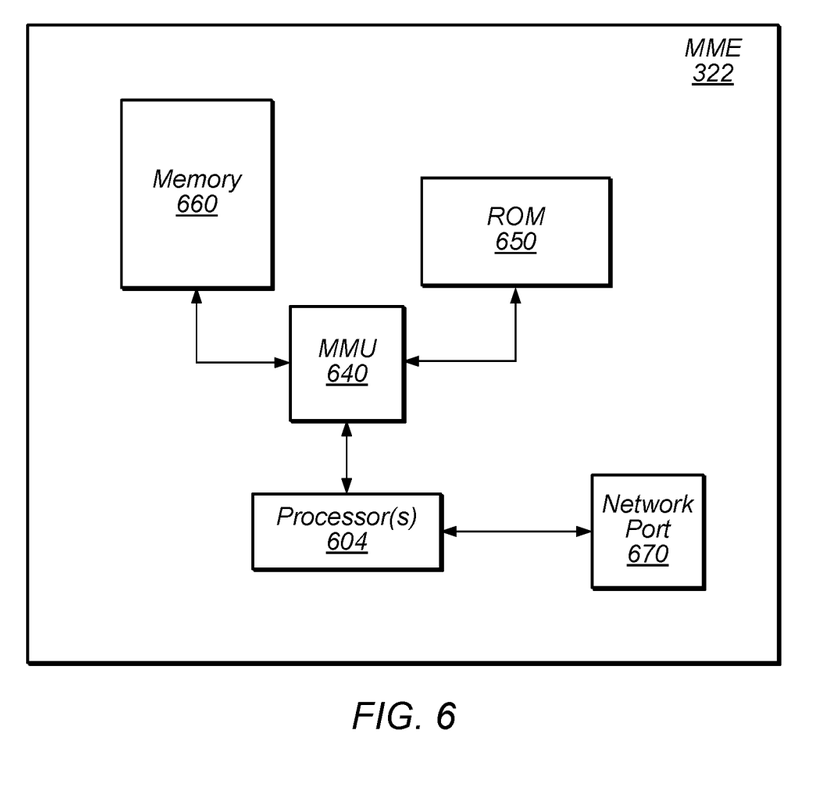
FIG. 6 illustrates an exemplary block diagram of an MME, according to some embodiments.

FIG. 6—Mobility Management Entity

FIG. 6 illustrates an exemplary block diagram of a mobility management entity (MME) 322, according to some embodiments. It is noted that the MME 322 of FIG. 6 is merely one example of a possible MME 322. As shown, the MME 322 may include processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, S6a, and/or any of various other communication protocols or interfaces to communicate with other cellular network components.

The processor(s) 604 of the MME 322 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
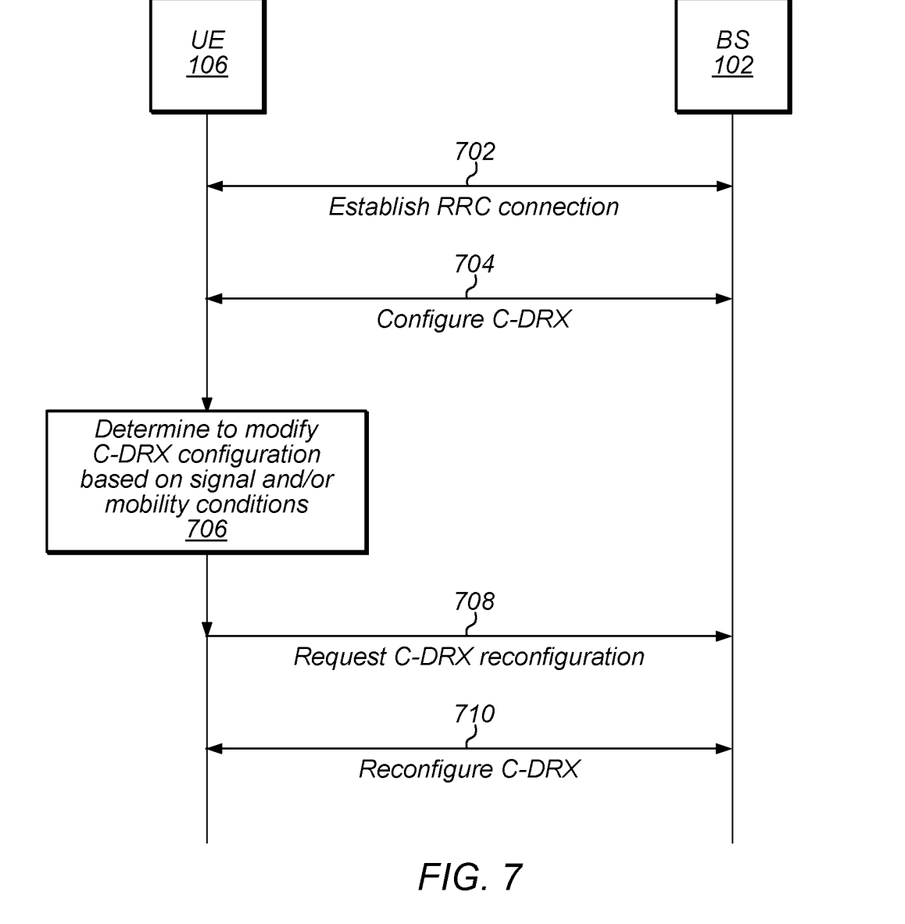
FIG. 7 is a communication flow diagram illustrating an exemplary method for modifying the C-DRX configuration of a wireless device based on signal and/or mobility conditions of the wireless device, according to some embodiments.

FIG. 7—Communication Flow Diagram

In LTE, a UE may be able to operate in one of the two modes, an idle mode and a connected mode. In the idle mode, Discontinuous Reception (DRX) allows the UE to switch off its radio receiver and thereby reduce its power consumption. At least in some embodiments, it may be the case that a UE enters the idle mode upon receiving a Radio Resource Control (RRC) connection release message from the network. In the connected mode, a UE can be in active data transmission or in a connected mode DRX (C-DRX). The C-DRX pattern may, for example, be used by the UE if configured by the network, and may follow a defined pattern of on and off cycles. DRX can be configured using any of a variety of settings, and at least in some instances multiple DRX modes (e.g., a short DRX or a long DRX) may be configured as desired.

FIG. 7 is a communication/signal flow diagram illustrating a scheme for modifying C-DRX configuration based on mobility and signal conditions, according to some embodiments. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, a UE 106 and a BS 102 may establish an RRC connection. This may be scheduled in advance or unscheduled. The UE 106 may perform a random access channel (RACH) procedure in order to establish the RRC connection. Alternatively, the BS 102 may page the UE 106 at a scheduled time, and the UE 106 may respond to the paging message and exchange RRC connection establishment parameters with the BS 102 to establish the scheduled RRC connection.

Certain configuration information may be exchanged as part of the RRC connection establishment procedure, at least in some embodiments. Such information may include timing alignment information, connection release procedures and/or parameters, and/or any of various other types of information.

In 704, the UE 106 and the BS 102 may configure C-DRX. In some embodiments, C-DRX for the UE 106 may be configured as part of the RRC connection establishment. Alternatively, C-DRX may be configured at a later time, e.g., in a manner initiated by the UE 106 or the BS 102. Establishing C-DRX may include negotiating one or more configuration parameters or settings for the C-DRX, according to some embodiments. For example, the UE 106 may request specific C-DRX parameters or settings and/or indicate more general information (such as an application data type that will be performing data communication) and/or preferences that may the affect C-DRX configuration, based on which the BS 102 may select a C-DRX configuration for use by the UE 106 and the BS 102 when communicating with each other. As another possibility, the BS 102 may provide a selection of C-DRX configuration options to the UE 106, from which the UE 106 may select a C-DRX configuration and inform the BS 102 of its selection. Note further that in some instances, C-DRX settings, including conditions that trigger use of C-DRX, may be configured in advance of actually operating in C-DRX mode; for example, one possible C-DRX parameter may include a C-DRX inactivity timer, whose expiration may trigger use of C-DRX if a sufficient length of time passes without data activity between the UE 106 and the BS 102. Any number of variations on and/or alternatives to these example procedures for configuring C-DRX may also be used, according to various embodiments.

In addition (or alternatively) to a C-DRX inactivity timer, the C-DRX configuration parameters may include any of various other possible C-DRX configuration parameters, such as one or more C-DRX cycle lengths. The C-DRX cycle length may be a length of time between on-durations when operating in C-DRX. According to some embodiments, multiple possible C-DRX cycle lengths may be configured. For example, a "short C-DRX cycle length" might be configured to be used upon initially operating in C-DRX and for a specified number (e.g., which may also be a C-DRX configuration parameter) of C-DRX cycles, after which the UE 106 and the BS 102 may transition to use of a "long C-DRX cycle length". Another possible C-DRX configuration parameter may include an on-duration length, which may specify for how long the UE 106 remains awake (e.g., for monitoring control channels, performing cell/neighbor measurements and transmitting measurement reports, etc.) during each C-DRX cycle. As previously noted, other C-DRX configuration parameters are also possible.

As previously noted, operating in C-DRX may reduce power consumption relative to operating in connected mode without C-DRX; note further that longer C-DRX cycles may further reduce power consumption relative to shorter C-DRX cycles. The preferred C-DRX cycle length or range of lengths (e.g., assuming acceptable wireless medium conditions) may vary for different data types (e.g., associated with different applications), e.g., depending on typical data traffic pattern, data priority and/or Quality of Service (QoS) requirements, and/or other characteristics. For example, for some applications (e.g., an application that performs regular but relatively infrequent data communications, as one possibility), relatively longer C-DRX cycles (e.g., 320 ms, 640 ms, 1280 ms, etc.) may be acceptable, while for other applications (e.g., an application that performs regular, frequent data communications, as one possibility) shorter C-DRX cycles (e.g., 40 ms, 80 ms, etc.) may be preferable.

However, while operating in C-DRX may reduce power consumption by the UE 106, it may also reduce the frequency with which serving cell and/or neighboring cell measurements are taken and/or reported back to the serving cell. Thus, under conditions when such measurements are particularly important (e.g., when the UE 106 highly mobile and/or when serving cell signal strength is weak), a relatively short C-DRX cycle length, or even operating without C-DRX (e.g., with C-DRX disabled) may provide substantially better performance than a relatively high C-DRX cycle length, even for data types for which longer C-DRX cycles are generally otherwise acceptable (e.g., when the UE 106 is stationary and in good signal conditions). For example, delaying measurements and measurement reports may in turn delay handover procedures when the wireless device is highly mobile and/or experiencing weak serving cell strength, and in some instances could result in preventable radio link failure and call drops.

Accordingly, it may be desirable (at least in some instances) to consider mobility and/or signal conditions with respect to the C-DRX configuration of the UE device 106, and to (e.g., at least temporarily) shorten the C-DRX cycle or disable C-DRX altogether when mobility and/or signal conditions in conjunction with the C-DRX cycle length put the UE device 106 at risk of radio link failure and/or call drops.

Thus, in 706, the UE 106 may determine, based on signal conditions and/or mobility conditions of the UE 106, to modify (e.g., to request modification of) the C-DRX configuration, e.g., to reduce the C-DRX cycle length. In order to make such a determination, the UE 106 may monitor signal conditions, e.g., using any of various possible metrics indicative of signal conditions, such as reference signal received power (RSRP), reference signal received quality (RSRQ), received signal strength indicator (RSSI), Ec/Io, etc.

Similarly, the UE 106 may monitor mobility related conditions using any of various possible techniques for determining mobility conditions. According to some embodiments, the UE 106 may determine a mobility state or level of the UE 106. For example, the UE 106 may determine whether the UE 106 is 'mobile' or 'stationary'. Other mobility states (e.g., 'semi-stationary', 'semi-mobile', 'highly mobile' etc.) are also possible. The mobility state of the UE 106 may be determined based on any or all of various possible mobility indicators, including internal device based indicators (e.g., using motion detection device circuitry, such as gyroscope(s), accelerometer(s), and/or other sensing components, possibly in conjunction with a motion co-processor for analyzing measurement data from the motion sensing components), radio condition based indicators (e.g., how frequently the UE 106 has performed cell re-selections or handovers in a recent time period, and/or using signal strength, signal quality, and/or other metrics relating to the serving base station, neighboring base stations, etc.), etc. Note that the mobility state of the UE 106 may be associated with any of various time windows. For example, the mobility state of the UE 106 may be an instantaneous mobility state based on current conditions. As another possibility, the mobility state may be based on (average, total, or other measure of) an amount of motion over a (e.g., predetermined) period or window of time.

As one possibility for determining when longer C-DRX cycles are acceptable and when shorter C-DRX cycles are preferable, certain conditions may be defined, and if at least one (or at least two, or one or more specific combinations, etc.) of those conditions occurs while the C-DRX cycle length is above a certain threshold, the UE 106 may be triggered to request C-DRX re-configuration to reduce the C-DRX cycle length. As non-limiting examples, possible conditions to trigger (e.g., alone or in combination with other conditions) such a C-DRX reconfiguration request could include any or all of serving cell signal strength falling below a threshold, neighboring cell signal strength rising above serving cell signal strength, and/or mobility level of the UE 106 rising above a threshold, among various possible conditions. As another possibility, an algorithm or function that considers multiple signal condition and/or mobility condition related inputs along with the current C-DRX cycle length may be configured such that under circumstances when a shorter C-DRX cycle is expected to produce sufficiently better performance, the result triggers a request for C-DRX reconfiguration to reduce C-DRX cycle length.

According to some embodiments, the condition(s) or algorithm(s) for determining when to request C-DRX reconfiguration to reduce C-DRX cycle length based on signal and/or mobility conditions may be internally configured (e.g., by the designer of the UE 106), e.g., in accordance with device testing to determine appropriate conditions or algorithm(s) to provide good performance. As another possibility, the UE 106 may receive configuration information (e.g., as part of RRC connection establishment, or at another time) from the BS 102 indicating one or more thresholds or formulas to use for determining when to request C-DRX reconfiguration to reduce C-DRX cycle length based on signal and/or mobility conditions.

According to some embodiments, one or more signal strength based thresholds configured as part of one or more conditions for triggering C-DRX reconfiguration to reduce C-DRX cycle length may be the same threshold(s) used to trigger certain measurement and/or measurement reporting, or may be based on those same threshold(s). For example, as one possibility, an "A2" threshold that is used to trigger measurement reporting if serving cell strength falls below it may also be used to trigger a request to reduce C-DRX cycle length. As another possibility, a threshold that is offset (e.g., by a specific amount, such as 1 dBm, 2 dBm, 3 dBm etc.) from the A2 (or another such) threshold may be used to trigger a request to reduce C-DRX cycle length, according to some embodiments. For example, in order to prepare for the possibility of serving cell signal strength falling below the A2 threshold, signal strength falling below a slightly higher threshold (e.g., −112 dBm if A2 is −115 dBm, as one possibility) may trigger C-DRX reconfiguration to reduce C-DRX cycle length. Other network configured thresholds (and/or offsets from network configured thresholds), such as an "A3" threshold, may also or alternatively be used, as desired.

In 708, the UE 106 may transmit a request for C-DRX reconfiguration to the BS 102. The request may be transmitted based on determining to modify the C-DRX configuration to reduce C-DRX cycle length based on mobility and/or signal conditions. The request may be an explicit or implicit request to reduce C-DRX cycle length for the UE 106.

As one possibility, the request may be provided within the framework of proprietary or standards based functionality for requesting C-DRX configuration or reconfiguration provided by the network to which the BS 102 belongs. For example, such a framework may include the capability for a UE 106 to request C-DRX reconfiguration, including specifying one or more parameters, such as C-DRX cycle length, for which modification is requested, and possibly further including specifying one or more requested values of those parameters, e.g., in a RRC information element or MAC control element. As another possibility, a more limited signaling capability may be provided; for example, a UE 106 might be able to request C-DRX reconfiguration to more generally provide better performance (e.g., by reducing C-DRX cycle length, among various possible performance increasing modifications) or provide reduced power consumption (e.g., by increasing C-DRX cycle length, among various possible power consumption reducing modifications).

As a still further possibility, the request may be provided outside of such an explicit C-DRX reconfiguration request framework, using existing signaling functionality to implicitly request a C-DRX cycle length reduction. For example, according to some embodiments, a power performance indicator bit set to request performance emphasis may be provided as the request for C-DRX reconfiguration, which the BS 102 may implicitly interpret as requesting C-DRX reconfiguration to reduce the C-DRX cycle length.

Note that while the UE 106 may determine to request C-DRX reconfiguration based on signal and/or mobility conditions such as described above herein, as a further possibility the BS 102 may also or alternatively be configured to determine when and how to reconfigure C-DRX with the UE 106 based on mobility and/or signal conditions at the UE 106. For example, the BS 102 could specify certain measurement configurations (e.g., A2/A3 measurement configurations) for C-DRX modification purposes, e.g., to assist with highly mobile and/or weak signal conditions. These A2/A3 measurement configurations can be the same as or can be separate (e.g., different) from those used for handover triggers. In such a case, the UE 106 may provide measurement reports in accordance with these measurement configurations to the BS 102, which may in turn determine (e.g., based on one or more conditions, algorithms, functions, etc.) to modify the C-DRX configuration of the UE 106 (e.g., to assist with mobility) to decrease C-DRX cycle length.

In 710, the UE 106 and the BS 102 may reconfigure C-DRX, e.g., based on the request from the UE 106 to reconfigure C-DRX (and/or possibly based on the BS 102 determining to reconfigure C-DRX for the UE 106 based on measurement reports received from the UE 106 in accordance with measurement configurations provided from the BS 102 to the UE 106). This may include a negotiation process (e.g., similar that used when initially configuring C-DRX) or may include the BS 102 providing updated C-DRX configuration parameters to the UE 106, among various possibilities. In either case, the updated C-DRX configuration may include a reduced C-DRX cycle length. As another possibility, reconfiguring C-DRX may include disabling C-DRX altogether. In this case, the UE 106 may actively monitor the downlink control channel continuously, e.g., until the RRC connection is released or C-DRX is again initiated (e.g., as a result of the UE 106 requesting C-DRX reconfiguration, the BS 102 providing a command to reinstate C-DRX, and/or a C-DRX inactivity timer expiring).

According to some embodiments, it may also be possible for the UE 106 to request C-DRX reconfiguration to increase C-DRX cycle length based on mobility and/or signal conditions. For example, one or more conditions and/or algorithm(s) may be used to trigger the UE 106 to initiate C-DRX reconfiguration to increase C-DRX cycle length if signal conditions improve and/or mobility conditions become more stationary after the UE 106 has previously decreased C-DRX cycle length due to poor signal conditions and/or high mobility conditions, and/or if the application(s) currently active at the UE 106 are able to support a longer C-DRX cycle length. The conditions and/or algorithm(s) may be based on similar thresholds (e.g., with a hysteresis inducing factor) as used for triggering C-DRX reconfiguration to decrease C-DRX cycle length, or may be based on different thresholds. For example, a condition for requesting C-DRX reconfiguration to increase C-DRX cycle length may be based at least in part on serving cell strength rising above an "A1" threshold (or a threshold offset from the A1 threshold, such as 1 dBm higher than the A1 threshold).

Alternatively or in addition, it may be possible for the BS 102 to determine to reconfigure C-DRX for the UE 106 to increase C-DRX cycle length based on mobility and/or signal conditions. For example, the BS 102 could specify one or more measurement configurations (e.g., an A1 measurement configuration) for C-DRX modification purposes, e.g., similar to the measurement configurations described herein above as being usable to assist with shortening the C-DRX cycle of the UE 106, but instead being usable to assist with returning the UE 106 to a longer C-DRX cycle when mobility and/or signal conditions are adequate for such a longer C-DRX cycle. The A1 measurement configuration for C-DRX modification purposes can be the same as or can be separate (e.g., different) from an A1 measurement configuration used for handover triggers. In such a case, the UE 106 may provide measurement reports in accordance with the measurement configuration to the BS 102, which may in turn determine (e.g., based on one or more conditions, algorithms, functions, etc.) to modify the C-DRX configuration of the UE 106 (e.g., to improve its power consumption profile) to increase C-DRX cycle length.

If it is determined by the UE 106 to request C-DRX reconfiguration to increase C-DRX cycle length, the UE 106 may transmit a request to re-configure C-DRX to increase C-DRX cycle length to the BS 102, e.g., using a similar signaling technique (albeit with different content) as used to request C-DRX reconfiguration to decrease C-DRX cycle length. In this case or in case the BS 102 determines to reconfigure C-DRX for the UE 106 to increase C-DRX cycle length, the UE 106 and the BS 102 may again re-configure C-DRX, this time with an increased C-DRX cycle length (which may include reinstating C-DRX, e.g., if C-DRX was disabled as a result of the previous request for C-DRX reconfiguration). According to some embodiments, the requested C-DRX cycle length may be based at least in part on which application(s) are currently active at the UE 106.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a wireless user equipment (UE) device to:
   establish a radio resource control (RRC) connection with a base station providing a cell of a cellular network;
   configure connected mode discontinuous reception (C-DRX) with the base station, wherein configuring the C-DRX comprises selecting a first C-DRX cycle length;
   receive configuration information from the base station specifying at least a first signal strength threshold for C-DRX reconfiguration;
   detect that a signal strength of the base station is below the first signal strength threshold for C-DRX reconfiguration;
   transmit a request for the first C-DRX reconfiguration to the base station based on detecting that the signal strength of the base station is below the first signal strength threshold for C-DRX reconfiguration, wherein the first C-DRX reconfiguration specifies a second C-DRX cycle length, less than the first C-DRX cycle length;
   reconfigure the C-DRX with the base station based on the request for the first C-DRX reconfiguration;
   detect a second one or more conditions configured to trigger the UE device to request a second C-DRX reconfiguration;
   determine a data traffic pattern of one or more applications executing on the UE device;
   determine a third C-DRX cycle length based on the second one or more conditions and the data traffic pattern of the one or more applications executing on the UE device;
   transmit a request for the second C-DRX reconfiguration to the base station based on detecting the second one or more conditions, wherein the second C-DRX reconfiguration specifies the third C-DRX cycle length, larger than the second C-DRX cycle length; and
   reconfigure the C-DRX with the base station based on the request for the second C-DRX reconfiguration.

2. The apparatus of claim 1, wherein said transmitting the request for the first C-DRX reconfiguration is further based on a mobility state of the UE device.

3. The apparatus of claim 1, wherein said transmitting the request for the first C-DRX reconfiguration is further based at least in part on a signal strength of one or more neighboring cells.

4. The apparatus of claim 1, wherein said transmitting the request for the first C-DRX reconfiguration is further based on a number of cell reselections that have occurred within a predetermined time period.

5. The apparatus of claim 1, wherein said transmitting the request for the first C-DRX reconfiguration is further based on the C-DRX cycle length being above a C-DRX cycle length threshold.

6. The apparatus of claim 1, wherein the request for the first C-DRX reconfiguration comprises a request to disable the C-DRX, wherein reconfiguring the C-DRX comprises disabling the C-DRX.

7. A user equipment (UE) device, comprising:
   an antenna;
   a radio coupled to the antenna; and
   a processing element coupled to the radio;
   wherein the antenna, the radio, and the processing element are configured to:
      establish a radio resource control (RRC) connection with a base station of a cellular network;
      receive connected mode discontinuous reception (C-DRX) configuration information indicating a first C-DRX cycle length and indicating at least a first signal strength threshold for C-DRX reconfiguration;
      determine that a signal strength of the base station is below the first signal strength threshold for C-DRX reconfiguration;
      transmit a request for a first C-DRX reconfiguration to the base station based on determining that the signal strength of the base station is below the first signal strength threshold for C-DRX reconfiguration;
      reconfigure the C-DRX with the base station based on the request for the first C-DRX reconfiguration;
      determine a second one or more conditions of the UE device;
      determine a data traffic pattern of one or more applications executing on the UE device;
      determine a second C-DRX cycle length based on the second one or more conditions and the data traffic pattern of the one or more applications executing on the UE device;
      transmit a request for a second C-DRX reconfiguration to the base station based on detecting the second one or more conditions, wherein the second C-DRX reconfiguration specifies the second C-DRX cycle length; and
      reconfigure the C-DRX with the base station based on the request for the second C-DRX reconfiguration.

8. The UE device of claim 7, wherein the first C-DRX reconfiguration specifies a third C-DRX cycle length, less than the first C-DRX cycle length, wherein the second C-DRX cycle length based on the second one or more conditions and the one or more applications executing on the UE device is longer than the third C-DRX cycle length.

9. The UE device of claim 7, wherein the UE device is further configured to:
   apply one or more offset values to modify the one or more signal strength thresholds indicated in the configuration information received from the base station,
   wherein determining to request the first C-DRX reconfiguration is further based at least in part on the modified one or more signal strength thresholds.

10. The UE device of claim 7, wherein the first C-DRX reconfiguration indicates to disable the C-DRX.

11. The UE device of claim 7,
   wherein the request for the first C-DRX reconfiguration comprises a power performance indicator bit set to request a configuration emphasizing performance over power.

12. The UE device of claim 7, wherein transmitting the request for the first C-DRX reconfiguration is further based on a mobility state of the UE device.

13. A non-transitory computer readable memory medium comprising program instructions that, when executed, cause a wireless user equipment (UE) device to:

establish a radio resource control (RRC) connection with a base station providing a cell to the UE device;

receive first connected mode discontinuous reception (C-DRX) configuration information indicating a first C-DRX cycle length and indicating at least a first signal strength threshold for C-DRX reconfiguration;

determine to request a first C-DRX reconfiguration to reduce the C-DRX cycle length based on a signal strength of the base station being below the first signal strength threshold for C-DRX reconfiguration;

transmit a request for the first C-DRX reconfiguration to reduce the C-DRX cycle length to the base station based on determining to request the first C-DRX reconfiguration to reduce the C-DRX cycle length; and receive first C-DRX reconfiguration information modifying the C-DRX configuration to reduce the C-DRX cycle length from the base station in response to the request for the first C-DRX reconfiguration;

reconfigure the C-DRX configuration based on the first C-DRX reconfiguration information;

determine to request a second C-DRX reconfiguration to increase the C-DRX cycle length based on a second one or more conditions experienced by the UE device and a data traffic pattern of one or more applications executing on the UE device;

transmit a request for the second C-DRX reconfiguration to increase the C-DRX cycle length to the base station based on determining to request the second C-DRX reconfiguration to increase the C-DRX cycle length;

receive second C-DRX reconfiguration information modifying the C-DRX configuration to increase the C-DRX cycle length from the base station in response to the request for the second C-DRX reconfiguration; and reconfigure the C-DRX configuration based on the second C-DRX reconfiguration information.

14. The non-transitory computer readable memory medium of claim 13, wherein determining to request the first C-DRX reconfiguration is further based at least in part on a mobility level of the UE device increasing above a mobility level threshold.

15. The non-transitory computer readable memory medium of claim 13, wherein determining to request the first C-DRX reconfiguration is further based at least in part on a signal strength of a neighboring cell rising above a signal strength of the serving cell.

16. The non-transitory computer readable memory medium of claim 13, wherein determining to request the first C-DRX reconfiguration is further based at least in part on the C-DRX cycle length being above a C-DRX cycle length threshold.

* * * * *